United States Patent
Kure et al.

(10) Patent No.: US 9,490,994 B2
(45) Date of Patent: Nov. 8, 2016

(54) RECEPTION DEVICE, TRANSMISSION/RECEPTION SYSTEM, RECEPTION METHOD, AND PROGRAM

(71) Applicant: Sony Corporation, Tokyo (JP)

(72) Inventors: Yoshinobu Kure, Kanagawa (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/427,810

(22) PCT Filed: Aug. 14, 2013

(86) PCT No.: PCT/JP2013/071933
§ 371 (c)(1),
(2) Date: Mar. 12, 2015

(87) PCT Pub. No.: WO2014/045768
PCT Pub. Date: Mar. 27, 2014

(65) Prior Publication Data
US 2015/0249545 A1    Sep. 3, 2015

(30) Foreign Application Priority Data

Sep. 20, 2012 (JP) ................................. 2012-206848

(51) Int. Cl.
| | | |
|---|---|---|
| H04H 20/71 | (2008.01) | |
| H04L 12/18 | (2006.01) | |
| H04W 4/06 | (2009.01) | |
| H04N 21/442 | (2011.01) | |

(Continued)

(52) U.S. Cl.
CPC ......... *H04L 12/1886* (2013.01); *H04L 1/0001* (2013.01); *H04N 21/44209* (2013.01); *H04N 21/631* (2013.01); *H04N 21/6405* (2013.01); *H04W 4/06* (2013.01); *H04W 76/002* (2013.01)

(58) Field of Classification Search
None
See application file for complete search history.

(56) References Cited

U.S. PATENT DOCUMENTS

| 2002/0003798 A1 | 1/2002 | Sato et al. |
| 2006/0105765 A1 | 5/2006 | Matsui et al. |

(Continued)

FOREIGN PATENT DOCUMENTS

| JP | 2001-320324 A | 11/2001 |
| JP | 2004-128768 A | 4/2004 |

(Continued)

OTHER PUBLICATIONS

Floyd et al., TCP Friendly Rate Control (TFRC): Protocol Specification, draft-ietf-dccp-rfc3448bis-06.txs, Internet Engineering Task Force, Apr. 12, 2008, vol. dccp, No. 6, pp. 1-65.

(Continued)

*Primary Examiner* — Phirin Sam
(74) *Attorney, Agent, or Firm* — Wolf, Greenfield & Sacks, P.C.

(57) ABSTRACT

There is provided a reception device including a reception unit that receives stream data transmitted by multicast transmission from a plurality of transmitters at respective different transmission rates in a physical layer, an acquisition unit that acquires environment change information related to a change in a network environment with the transmitters, and a connection destination selection unit that selects, on the basis of the acquired environment change information, one transmitter from among the plurality of transmitters as a connection destination of the reception unit.

10 Claims, 11 Drawing Sheets

(51) Int. Cl.
  *H04N 21/63*    (2011.01)
  *H04N 21/6405*  (2011.01)
  *H04W 76/00*    (2009.01)
  *H04L 1/00*     (2006.01)

(56) References Cited

U.S. PATENT DOCUMENTS

| | | | |
|---|---|---|---|
| 2007/0049314 A1* | 3/2007 | Balachandran | H04W 4/10 455/518 |
| 2007/0177555 A1 | 8/2007 | Brueck et al. | |
| 2007/0253388 A1* | 11/2007 | Pietraski | H04J 13/00 370/338 |
| 2008/0102749 A1 | 5/2008 | Becker | |
| 2008/0298336 A1* | 12/2008 | Gollamudi | H04B 7/022 370/343 |
| 2008/0298450 A1* | 12/2008 | Zhang | H04L 1/0006 375/227 |
| 2010/0022262 A1* | 1/2010 | Aue | H04W 16/14 455/501 |
| 2010/0074113 A1* | 3/2010 | Muramoto | H04L 43/0864 370/235 |
| 2010/0110912 A1* | 5/2010 | Wang | H04B 7/022 370/252 |
| 2011/0086656 A1* | 4/2011 | Zhou | H04W 8/24 455/507 |
| 2011/0286340 A1 | 11/2011 | Janecek et al. | |
| 2012/0014362 A1* | 1/2012 | Inada | H04W 40/22 370/338 |
| 2012/0106428 A1* | 5/2012 | Schlicht | H04L 1/0015 370/312 |
| 2012/0151261 A1* | 6/2012 | Suneya | H04L 1/0009 714/18 |
| 2013/0139208 A1* | 5/2013 | Ramakrishnan | H04N 21/26616 725/97 |
| 2013/0188542 A1* | 7/2013 | Merlin | H04W 40/22 370/311 |
| 2013/0235742 A1* | 9/2013 | Josiam | H04W 24/10 370/252 |

FOREIGN PATENT DOCUMENTS

| | | |
|---|---|---|
| JP | 2009-060641 A | 3/2009 |
| JP | 2009-524991 A | 7/2009 |
| JP | 2012-105290 A | 5/2012 |
| WO | WO 2005/022845 A | 3/2005 |

OTHER PUBLICATIONS

Rejaie et al., RAP: An End-to-end Rate-based Congestion Control Mechanism for Realtime Streams in the Internet, Infocom '99, 18th Annual Joint Conference of the IEEE Computer and Communications Societies Proceedings, IEEE, 1999, vol. 3, pp. 1337-1345.

* cited by examiner

FIG. 4
TRANSMISSION DEVICE
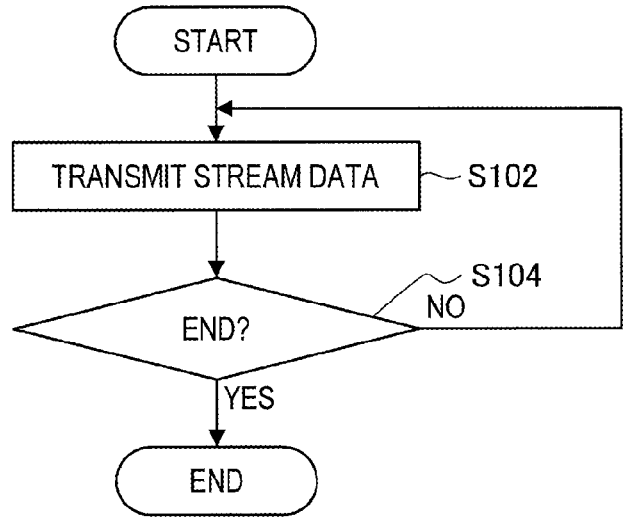
(a)
RECEPTION DEVICE
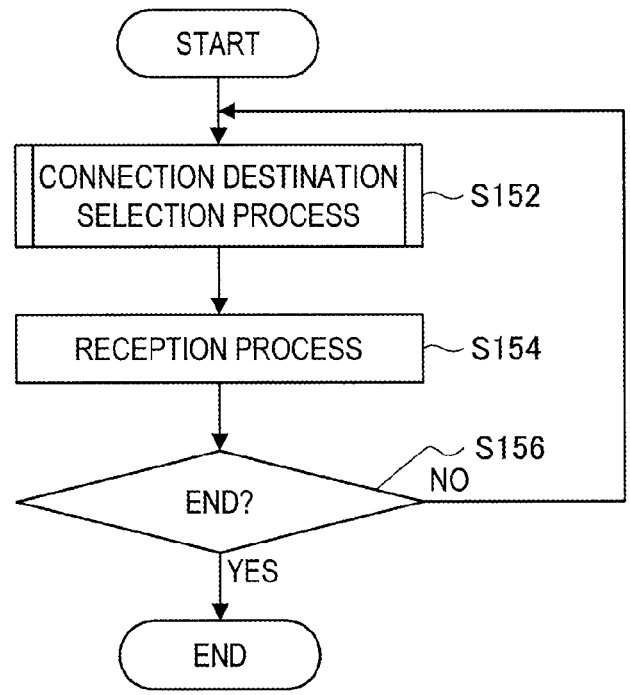
(b)

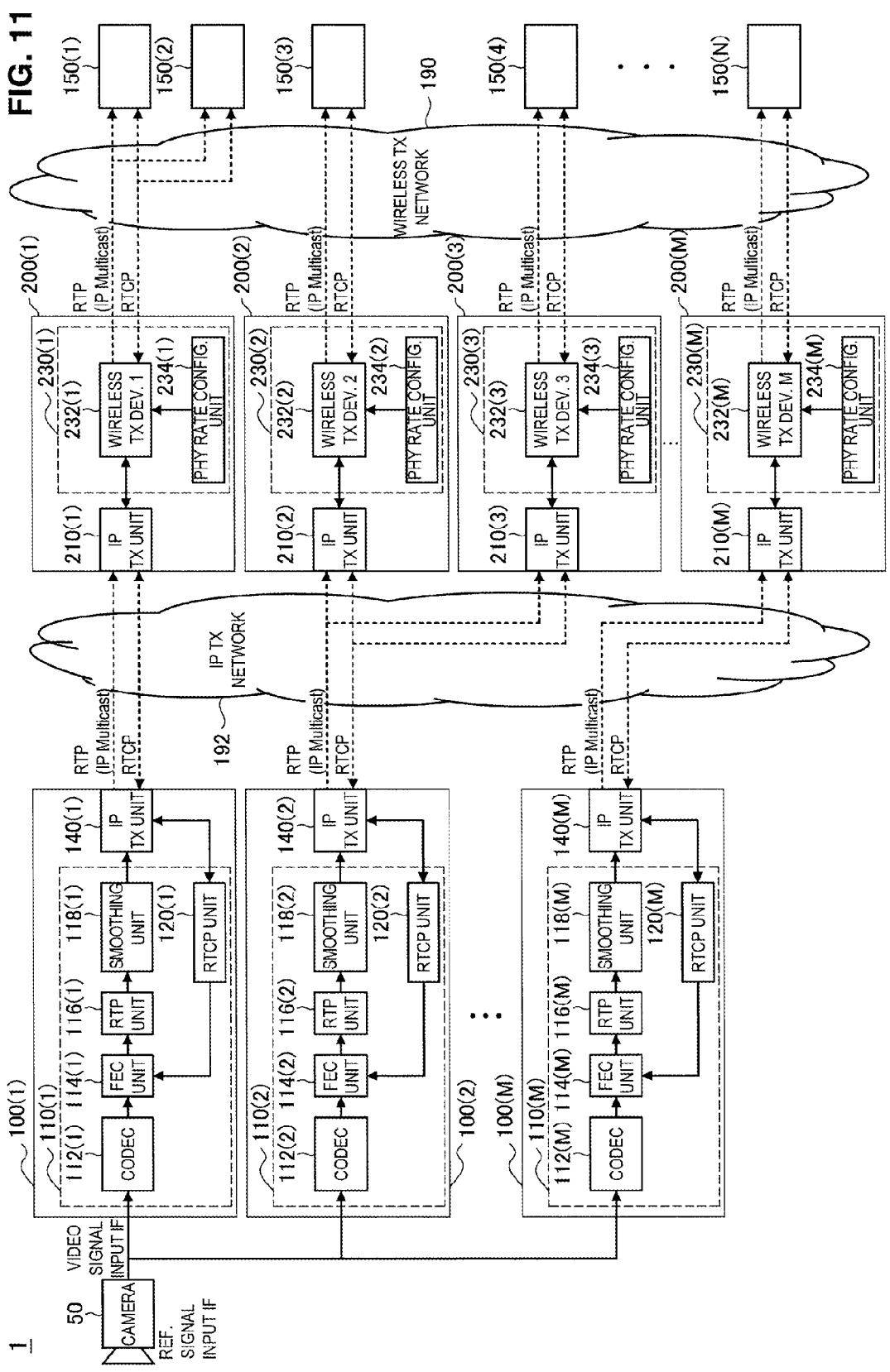

RECEPTION DEVICE, TRANSMISSION/RECEPTION SYSTEM, RECEPTION METHOD, AND PROGRAM

CROSS REFERENCE TO RELATED APPLICATIONS

This is a U.S. National Stage Application under 35 U.S.C. §371, based on International Application No. PCT/JP2013/071933, filed Aug. 14, 2013, which claims priority to Japanese Patent Application JP 2012-206848, filed Sep. 20, 2012, each of which is hereby incorporated by reference in its entirety.

TECHNICAL FIELD

The present disclosure relates to a reception device, a transmission/reception system, a reception method, and a program.

BACKGROUND ART

Recently, there is growing demand for wireless streaming delivery of multimedia data such as video and audio from a transmission device to a plurality of reception devices (for example, mobile terminals). For example, a transmission device compresses content at a plurality of transmission rates in advance and transmits the content by IP multicasting, while a reception device receives the content while selectively switching between appropriate transmission rates according to the congestion conditions of the network between the reception device and the transmission device.

The method corresponding to IP multicasting may be a streaming method using the Real-time Transport Protocol (RTP) stipulated in IETF RFC 3550 using the User Datagram Protocol (UDP) as the transport protocol, otherwise known as RTP streaming. RTP streaming is also capable of transmitting to a reception device via a wireless local area network (LAN) conforming to the IEEE 802.11 standard, and is effective in the case of transmitting to a plurality of reception devices by multicasting.

Particularly, when considering transmission to a plurality of reception devices, in the case of a wired connection, the link between a relay and a reception device may be connected independently. However, in the case of wireless transmission, the wireless transmission frequency band is shared among all reception devices, and the use of multicasting is effective because unicast transmission to a plurality of reception devices cannot be conducted efficiently.

CITATION LIST

Patent Literature

Patent Literature 1: JP 2001-320324A

SUMMARY OF INVENTION

Technical Problem

Meanwhile, in the case of implementing one-to-many communication by multicast transmission, since the wireless transmission environment differs between the transmission device and the reception device, it is desirable to transmit while adjusting the transmission rate of the media data and the transmission rate in the physical layer (PHY rate) according to the transmission environment at the transmission device. However, because of the limitations of multicast transmission, transmission from the transmission terminal is conducted at one transmission rate for all reception terminals, and thus there is a risk that reception devices in different transmission environments will be unable to receive data of appropriate quality.

Accordingly, the present disclosure proposes a method of receiving data of appropriate quality even when the network environment varies from one reception device to another during multicast transmission of content data.

Solution to Problem

According to an embodiment of the present disclosure, there is provided a reception device including a reception unit that receives stream data transmitted by multicast transmission from a plurality of transmitters at respective different transmission rates in a physical layer, an acquisition unit that acquires environment change information related to a change in a network environment with the transmitters, and a connection destination selection unit that selects, on the basis of the acquired environment change information, one transmitter from among the plurality of transmitters as a connection destination of the reception unit.

According to another embodiment of the present disclosure, there is provided a transmission/reception system including a plurality of transmitters that transmit stream data by multicast transmission at respective different transmission rates in a physical layer, and one or a plurality of reception devices that receive the stream data transmitted by multicast transmission from the transmitters. The reception device includes a reception unit that receives stream data transmitted by multicast transmission from the plurality of transmission units at respective different transmission rates in a physical layer, an acquisition unit that acquires environment change information related to a change in a network environment with the transmitters, and a connection destination selection unit that selects, on the basis of the acquired environment change information, one transmitter from among the plurality of transmitters as a connection destination of the reception unit.

According to another embodiment of the present disclosure, there is provided a reception method including receiving stream data transmitted by multicast transmission from a plurality of transmitters at respective different transmission rates in a physical layer, acquiring environment change information related to a change in a network environment with the transmitters, and selecting, on the basis of the acquired environment change information, one transmitter from among the plurality of transmitters as a connection destination of a reception unit.

According to another embodiment of the present disclosure, there is provided a program causing a computer to execute receiving stream data transmitted by multicast transmission from a plurality of transmitters at respective different transmission rates in a physical layer, acquiring environment change information related to a change in a network environment with the transmitters, and selecting, on the basis of the acquired environment change information, one transmitter from among the plurality of transmitters as a connection destination of a reception unit.

Advantageous Effects of Invention

According to the present disclosure as described above, it becomes possible to receive data of appropriate quality even when the network environment varies from one reception device to another during multicast transmission of content data.

BRIEF DESCRIPTION OF DRAWINGS

FIG. 4 is a flowchart illustrating an exemplary stream data transmission process.

FIG. 11 is a block diagram illustrating an exemplary configuration of a multicast system 1 according to the fifth embodiment.

DESCRIPTION OF EMBODIMENTS

Figure 1:
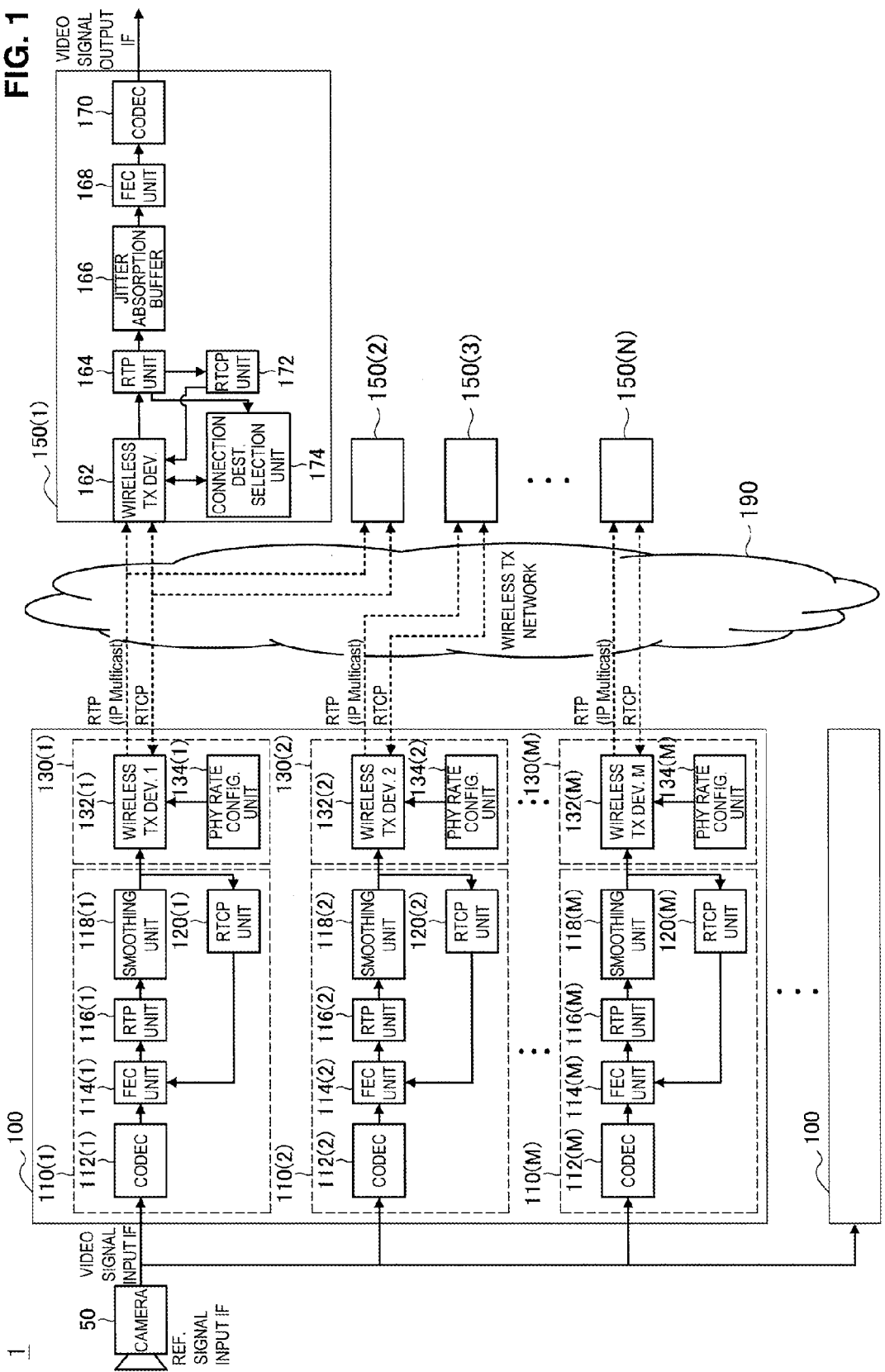
FIG. 1 is a block diagram illustrating an exemplary configuration of a multicast system 1 according to the first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. First Embodiment
1-1. Overview of multicast system
1-2. Exemplary configuration of transmission device
1-3. Exemplary configuration of reception device
1-4. Connection relationship between transmission device 100 and reception device 150
1-5. Exemplary arrangement of plurality of transmission devices
1-6. Stream data transmission process
1-6-1. Exemplary process by transmission device 100
1-6-2. Exemplary process by reception device 150
1-7. Connection method
2. Second Embodiment
3. Third Embodiment
4. Fourth Embodiment
5. Fifth Embodiment
6. Conclusion <1. First Embodiment>
(1-1. Overview of Multicast System)

An overview of a multicast system 1 according to the first embodiment of the present disclosure will be described with reference to FIG. 1.

FIG. 1 is a block diagram illustrating an exemplary configuration of a multicast system 1 according to the first embodiment. As illustrated in FIG. 1, the multicast system 1 includes a camera 50, a plurality of transmission devices 100, and a plurality of reception devices 150(1) to 150(N).

The camera 50 is a video camera that captures moving images or still images, for example. The camera 50 transmits uncompressed data, including information such as captured uncompressed images and audio data, to the plurality of transmission devices 100 via a video signal input IF. In other words, uncompressed data of the same content is input into the plurality of transmission devices 100.

The transmission devices 100 generate stream data at different transmission rates on the basis of the uncompressed data input from the camera 50, and transmit the stream data to the reception devices 150(1) to 150(N) by multicast transmission. Specifically, the transmission devices 100 conduct compression coding at respective different compression rates on the uncompressed data input from the camera 50, and generate compressed stream data. Subsequently, the transmission devices 100 transmit the generated stream data by multicast transmission at a predetermined transmission rate. Note that a detailed configuration of the transmission devices 100 will be discussed later.

The reception devices 150(1) to 150(N) receive stream data transmitted by multicast transmission from the transmission devices 100. Note that a detailed configuration of the reception devices 150 will be discussed later.

(1-2. Exemplary Configuration of Transmission Device)

Next, an exemplary configuration of a transmission device 100 according to the first embodiment will be described. As illustrated in FIG. 1, a transmission device 100 includes a plurality of stream generation units 110(1), 110(2), . . . , 110(M) (hereinafter collectively designated the stream generation units 110), and a plurality of wireless transmission units 130(1), 130(2), . . . , 130(M) (hereinafter collectively designated the wireless transmission units 130), which are an example of a transmitter.

(Exemplary Configuration of Stream Generation Unit 110)

Uncompressed data of the same content is input from the camera 50 into the plurality of stream generation units 110(1), 110(2), . . . , 110(M). The stream generation units 110(1) to 110(M) conduct compression coding at respective different compression rates on the input uncompressed data, and generate compressed stream data. For this reason, there are M types of data rates after compression by one transmission device 100.

Since the stream generation units 110(1) to 110(M) have a similar configuration, in the following, an exemplary configuration of a stream generation unit will be described by taking the stream generation unit 110(1) as an example. As illustrated in FIG. 1, the stream generation unit 110(1) includes a codec 112(1), an FEC unit 114(1), an RTP unit 116(1), a smoothing unit 118(1), and an RTCP unit 120(1).

The codec 112(1) conducts compression coding at a predetermined rate on the uncompressed data input from the camera 50. In addition, the codec 112(1) conducts an RTP packetization process conforming to IEEE 3550, and generates RTP stream data. Subsequently, the codec 112(1) outputs the generated RTP stream data to the FEC unit 114(1).

The FEC unit 114(1) conducts a forward error correction (FEC) process on the RTP stream data. The FEC unit 114(1) uses Reed-Solomon packet loss correction codes as the forward error correction codes, for example, to conduct redundant coding for recovery of lost packets. Subsequently, the FEC unit 114(1) outputs the redundantly coded data to the RTP unit 116(1).

The RTP unit 116(1) conducts an RTP packetization process conforming to IEEE 3550 on data including the redundantly coded data, and generates an RTP stream including the redundantly coded data. Subsequently, the RTP unit 116(1) outputs the generated RTP stream data to the smoothing unit 118(1).

The smoothing unit 118(1) performs a transmission rate smoothing process on the RTP stream. Subsequently, the smoothing unit 118(1) outputs the smoothed RTP stream to the wireless transmission unit 130(1).

The RTCP unit 120(1) transmits and receives RTCP sender report (SR) and receiver report (RR) packets conforming to the RTP Control Protocol (RTCP) described in IEEE 3550, for example, with the RTCP unit 172 of the reception devices 150(1) to 150(N).

(Exemplary Configuration of Wireless Transmission Unit 130)

The wireless transmission units 130(1) to 130(M) transmit stream data generated by the corresponding stream generation units 110(1) to 110(M) by multicast transmission at a predetermined transmission rate. For example, the wireless transmission unit 130(1) transmits the stream data generated by the stream generation unit 110(1), while the wireless transmission unit 130(2) transmits the stream data generated by the stream generation unit 110(2).

Additionally, in the present embodiment, the wireless transmission units 130(1) to 130(M) transmit the stream data generated by the corresponding stream generation units 110(1) to 110(M) by multicast transmission configured to a transmission rate in the physical layer (also called the PHY rate) that corresponds to the respective data rate after compression.

Since the wireless transmission units 130(1) to 110(M) have a similar configuration, in the following, an exemplary configuration of a wireless transmission unit will be described by taking the wireless transmission unit 130(1) as an example. As illustrated in FIG. 1, the wireless transmission unit 130(1) includes a wireless transmission device 132(1) and a PHY rate configuration unit 134(1).

The wireless transmission device 132(1) transmits the RTP stream data generated by the stream generation unit 110(1) to the reception devices 150(1) to 150(N) via a wireless transmission network 190 by multicast transmission. In other words, the wireless transmission device 132(1) transmits the RTP stream data to the plurality of reception devices 150(1) to 150(N). The wireless transmission device 132(1) is a wireless LAN device, for example.

The PHY rate configuration unit 134(1) configures a transmission rate in the physical layer (PHY rate) that corresponds to the compressed data rate that is compressed by the stream generation unit 110(1). The wireless transmission device 132(1) transmits the RTP stream data at the transmission rate configured by the PHY rate configuration unit 134(1).

At this point, the compressed data rate $Rd\_j$ (bps) generated by the stream generation unit $110(j)$ ($1 \leq j \leq M$, where j is an integer) and the PHY rate $Rp\_j$ (bps) configured by the PHY rate configuration unit $134(j)$ of the wireless transmission unit $130(j)$ satisfy the relationships in the following Formulas 1 to 3.

$$Rd\_j \geq Rd\_k (j<k) \quad \text{(Formula 1)}$$

$$Rp\_j \geq Rp\_k (j<k) \quad \text{(Formula 2)}$$

$$Rp\_j \geq Rdj (1 \leq j \leq M, \text{ where j is an integer}) \quad \text{(Formula 3)}$$

Meanwhile, the transmission device 100 according to the present embodiment, following the Real-time Transport Protocol (RTP) described in IETF RFC 3550, packetizes compressed data into RTP packets for transmission. In such a case, $Rd\_j$ (bps) indicates the data rate of the compressed data after the RTP stream packetized into RTP packets. Additionally, the content quality is high for data with a high compressed data rate, and if j<k according to Formula 1, the content quality of the stream data generated by the stream generation unit $110(j)$ is higher than the content quality of the stream data generated by the stream generation unit $110(k)$.

On the other hand, in the case of using a wireless LAN device following the IEEE 802.11 standard as the wireless transmission device 132(1), for example, the PHY rate $Rp\_j$ (bps) indicates the transmission rate in the physical layer of the wireless LAN device. To transmit the data rate Rdj of the RTP stream, a larger PHY rate $Rp\_j$ (bps) must be configured, while accounting for overhead such as the Ethernet frame header.

Additionally, in the case of communication using an IEEE 802.11 wireless LAN device, configuring a larger PHY rate requires a good network environment such as a good received signal strength indicator (RSSI), SN ratio, and frame loss ratio, which are required to realize a constant effective throughput. These network environment conditions degrade as the distance between the transmission device and the reception device increases, and are also affected by factors such as radio wave interference by other wireless devices and the presence of obstacles.

Generally, a wireless transmission unit with a lower PHY rate means a wider possible range of stable data communication, or in other words transmission range, between the transmission and reception devices. Consequently, when maintaining the relationships in the above Formulas 1 and 2, typically, if j<k is satisfied, the transmission range of the wireless transmission unit $130(j)$ becomes narrower than the transmission range of the wireless transmission unit $130(k)$.

(1-3. Exemplary Configuration of Reception Device)

The plurality of reception devices 150(1) to 150(N) receive stream data transmitted by multicast transmission from the wireless transmission units 130(1) to 130(M) of a transmission device 100. For example, as illustrated in FIG. 1, the reception device 150(1) and the reception device 150(2) receive stream data transmitted by multicast transmission from the wireless transmission unit 130(1). Similarly, stream data transmitted by multicast transmission from the other wireless transmission units 130(2) to 130(M) is received by the other reception devices.

Since the configuration of the reception devices 150(1) to 150(N) is similar, in the following, an exemplary configuration of a reception device will be described by taking the reception device 150(1) as an example. As illustrated in FIG. 1, the reception device 150(1) includes a wireless transmission device 162, which is an example of a reception unit, an RTP unit 164, a jitter absorption buffer 166, an FEC unit 168, a codec 170, an RTCP unit 172, and a connection destination selection unit 174.

The wireless transmission device 162 receives RTP stream data transmitted from a transmission device 100 via the wireless transmission network 190. The wireless transmission device 162 receives stream data transmitted by multicast transmission at respective different transmission rates in the physical layer from the plurality of wireless transmission units 130(1) to 130(M). The wireless transmission device 162 outputs the received RTP stream data to the RTP unit 164.

The RTP unit 164 analyzes the RTP packets of the RTP stream data. As a result, the RTP unit 164 collects network information about the RTP stream, such as the packet loss rate, network delay, and network jitter information. The RTP unit 164 outputs the analyzed RTP stream data to the jitter absorption buffer 166.

The jitter absorption buffer 166 performs a jitter absorption process on the RTP stream data analyzed by the RTP unit 164. In the jitter absorption process, jitter produced on the network is absorbed on the basis of RTP timestamp information added to the RTP packet header, for example. Subsequently, the jitter absorption buffer 166 outputs data to the FEC unit 168 at a time according to the RTP timestamp value.

When there is packet loss, the FEC unit 168 conducts packet loss recovery if the packet loss is recoverable with the data that was redundantly coded by the transmission device 100. Subsequently, the FEC unit 168 outputs the RTP stream data recovered from packet loss to the codec 170.

The codec 170 conducts a compression decoding process on the RTP stream data. Subsequently, the codec 170 outputs the uncompressed data resulting from the decoding process to a display device or the like, for example, via a video signal output IF.

The RTCP unit 172 transmits and receives RTCP sender report (SR) and receiver report (RR) packets conforming to the RTP Control Protocol (RTCP) described in IEEE 3550, for example, with an RTCP unit (for example, the RTCP unit 120(1)) of the transmission device 100. Consequently, network condition information in the RTP stream data acquired by the RTP unit 164 is exchanged between the transmission device 100 and the reception device 150.

As a result, the FEC unit 114(1) of the transmission device 100 is able to conduct the redundant coding process according to the network conditions. For example, the FEC unit 114(1) conducts redundant coding with a high level of redundancy in the case of a high packet loss rate at the reception device 150, and conducts redundant coding with a low level of redundancy in the case of a low packet loss rate.

The connection destination selection unit 174 acquires environment change information related to a change in the network environment with the transmission device 100, and on the basis of the acquired environment change information, selects one wireless transmission unit from among the plurality of wireless transmission units 130(1) to 130(M) as the connection destination of the wireless transmission device 162. As a result, the reception device 150 is able to switch to an optimal connection destination of the wireless transmission device 162 according to a change in the network environment.

The connection destination selection unit 174 may acquire a received signal strength from the wireless transmission units 130(1) to 130(M). Subsequently, the connection destination selection unit 174, on the basis of the acquired received signal strength, may select one wireless transmission unit from among the plurality of wireless transmission units 130(1) to 130(M) as the connection destination of the wireless transmission device 162. Since a change in the network environment may be suitably detected by acquiring the received signal strength, switching to an optimal connection destination according to a change in the network environment becomes easier.

Also, the connection destination selection unit 174 may acquire a TCP Friendly Rate Control (TFRC) transmission rate according to the TFRC rate control scheme. Subsequently, the connection destination selection unit 174, on the basis of the acquired TFRC transmission rate, may select one wireless transmission unit from among the plurality of wireless transmission units 130(1) to 130(M) as the connection destination of the wireless transmission device 162. Since a change in the network environment may be suitably detected by acquiring the TFRC transmission rate, switching to an optimal connection destination according to a change in the network environment becomes easier.

Also, the connection destination selection unit 174 may switch the connection destination to a wireless transmission unit corresponding to the next largest transmission rate following the transmission rate of the currently connected wireless transmission unit, or to a wireless transmission unit corresponding to the next smallest transmission rate following the transmission rate of the currently connected wireless transmission unit, as the selected one wireless transmission unit. Consequently, the content quality transmitted by the wireless transmission unit after switching may be prevented from diverging greatly from the content quality transmitted by the wireless transmission unit before switching.

(1-4. Connection Relationship Between Transmission Device 100 and Reception Device 150)

Next, connection relationships between a transmission device 100 that includes a plurality of wireless transmission units 130, and a plurality of reception devices 150, will be described with reference to FIG. 2.

Figure 2:
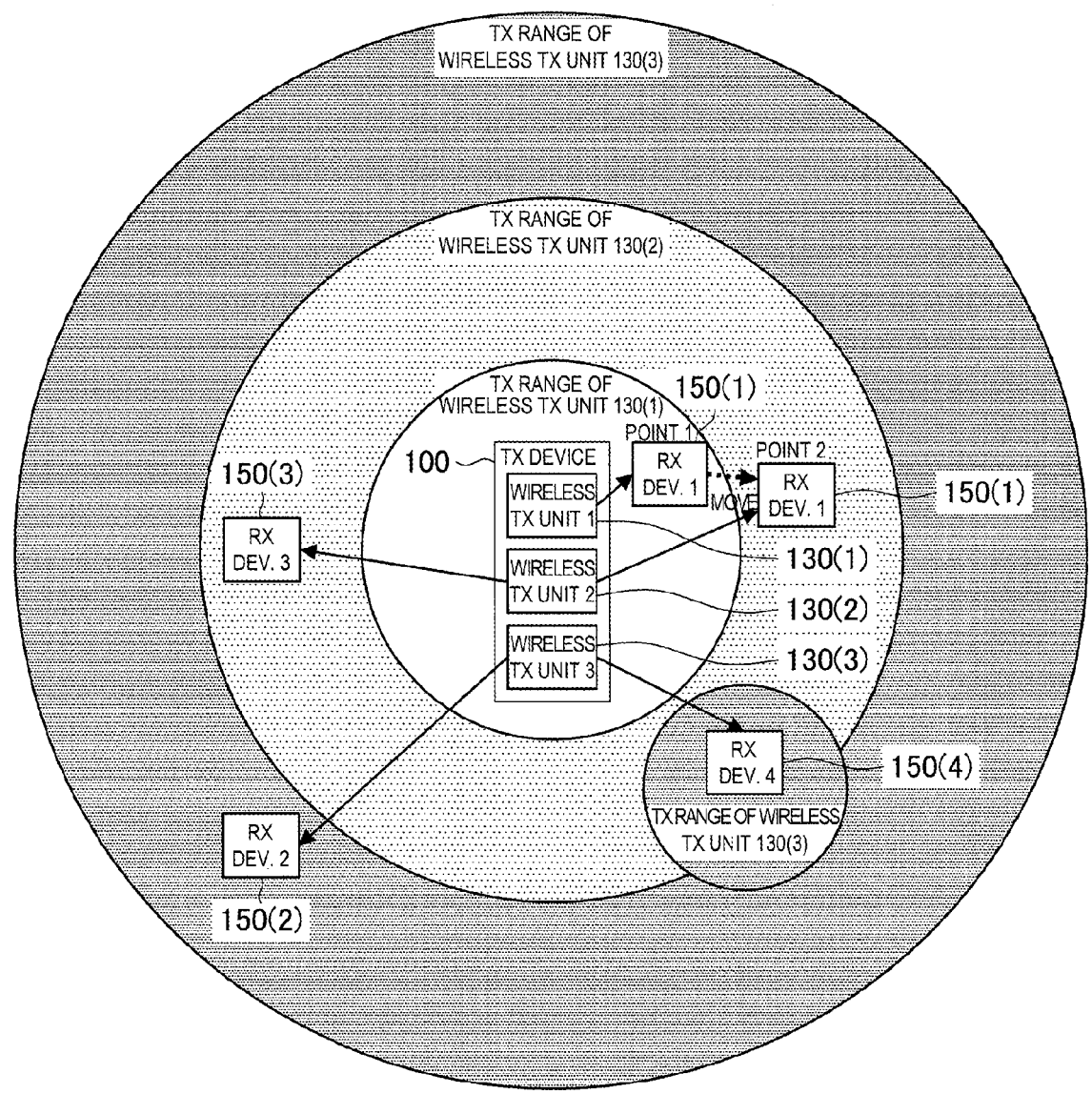
FIG. 2 is a schematic diagram for explaining connection relationships between a transmission device 100 that includes a plurality of wireless transmission units 130, and a plurality of reception devices 150.

FIG. 2 is a schematic diagram for explaining connection relationships between a transmission device 100 that includes a plurality of wireless transmission units 130, and a plurality of reception devices 150(1) to 150(4). Herein, the transmission device 100 includes three wireless transmission units 130(1), 130(2), and 130(3), which use IP multicasting to conduct real-time streaming to the four reception devices 150(1), 150(2), 150(3), and 150(4).

Also, as illustrated in FIG. 1, stream generation units 110(1), 110(2), and 110(3) that generate streams with respective different compressed data rates are connected to the wireless transmission units 130(1), 130(2), and 130(3). The stream data generated by the stream generation units 110(1), 110(2), and 110(3) is transmitted by IP multicasting via the corresponding wireless transmission units 130(1), 130(2), and 130(3).

Also, as illustrated in FIG. 2, the respective transmission ranges of the three wireless transmission units 130(1) to 130(3) differ from each other. Specifically, of the three wireless transmission units 130(1) to 130(3), the transmission range of the wireless transmission unit 130(1) is the narrowest, while the transmission range of the wireless transmission unit 130(3) is the widest. Note that the transmission ranges of the wireless transmission units 130(1) to 130(3) are also affected by factors such as radio wave interference by other wireless devices and the presence of obstacles. Meanwhile, regarding the quality of the stream data transmitted from the transmission device 100, of the three wireless transmission units 130(1) to 130(3), the quality of the stream data transmitted from the wireless transmission unit 130(1) is the highest, while the quality of the stream data transmitted from the wireless transmission unit 130(3) is the lowest.

In FIG. 2, the transmission ranges of the three wireless transmission units 130(1) to 130(3) are indicated by circles centered on the transmission device 100. Note that the transmission range of the wireless transmission unit 130(3)

near the reception device 150(4) sticks out into the transmission range of the wireless transmission unit 130(2). This is because the transmission range of the wireless transmission unit 130(2) has become an asymmetric range due to factors such as radio wave interference by other wireless devices and the presence of obstacles. In addition, the transmission range may be affected by radio wave interference by other wireless devices and vary over time.

Of the reception devices 150(1) to 150(4), the reception devices 150(2), 150(3), and 150(4) have a fixed installation position, whereas the reception device 150(1) is mobile. As illustrated in FIG. 2, when the reception device 150(1) is positioned at Point 1, the reception device 150(1) is within the transmission ranges of the three wireless transmission units 130(1) to 130(3), and thus is able to connect to any of the three wireless transmission units 130(1) to 130(3) with the connection destination selection unit 174. For example, in the case of selecting a connection destination to receive the stream data of the highest quality, the connection destination selection unit 174 connects to the wireless transmission unit 130(1).

Similarly, the reception device 150(2) is positioned at a location within the transmission range of the wireless transmission unit 130(3) and thus connects to the wireless transmission unit 130(3), while the reception device 150(3) is positioned at a location within the transmission range of the wireless transmission unit 130(2) and thus connects to the wireless transmission unit 130(2). The reception device 150(4) is positioned at a location that is now within the transmission range of the wireless transmission unit 130(3) due to factors such as radio wave interference by other wireless devices and the presence of obstacles, and thus connects to the wireless transmission unit 130(3).

If the reception device 150(1) moves from Point 1 to Point 2, the connection destination selection unit 174 senses a change in the network environment with the transmission device 100, and changes the connection destination from the wireless transmission unit 130(1) to the wireless transmission unit 130(2). Hypothetically, if the connection destination is not changed, the reception device 150(1) would become unable to receive stream data as a result of moving to Point 2. On the other hand, if the connection destination is changed, although there is a risk that the quality of receivable stream data may fall, it becomes possible to continue receiving the stream data.

Note that even if the reception device 150(1) stays at the same position, when the network environment with the transmission device 100 varies due to interference with another wireless transmission, the connection destination selection unit 174 changes the connection destination in accordance with the variance. Although the above describes the reception device 150(1) as an example, the connection destination is changed similarly for the other reception devices 150(2) to 150(4).

As described above, by changing the connection destination of the wireless transmission units 130(1) to 130(3) dynamically according to a change in the network environment between the reception devices 150(1) to 150(4) and the transmission device 100, streaming reception in response to the network environment becomes possible during IP multicast transmission.

(1-5. Exemplary Arrangement of Plurality of Transmission Devices)

As illustrated in FIG. 1, the multicast system 1 according to the first embodiment includes a plurality of transmission devices 100 that transmit the same stream data. In addition, to enable the reception of stream data from a transmission device 100 even if a reception device 150 moves, the plurality of transmission devices 100 are arranged innovatively as illustrated in FIG. 3.

Figure 3:
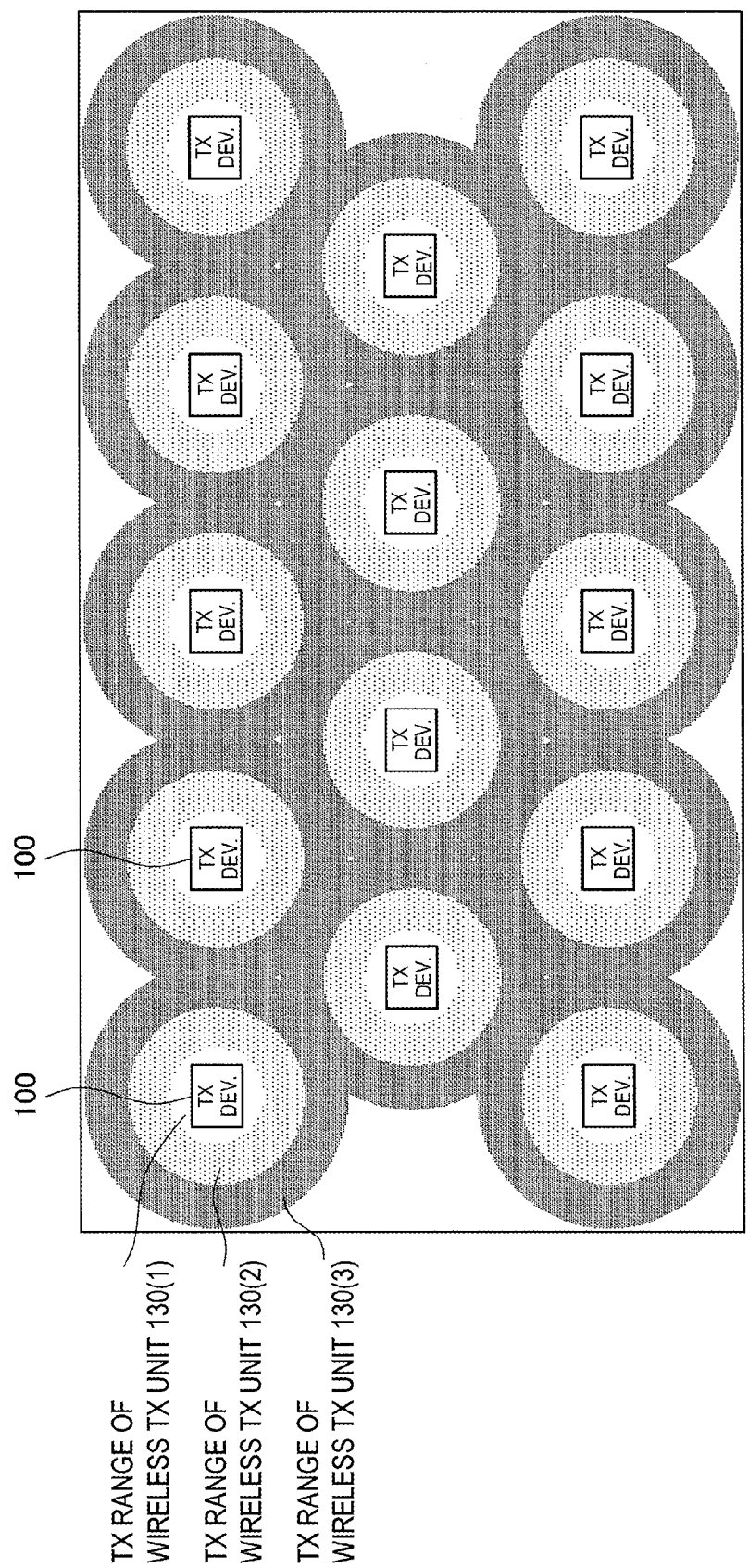
FIG. 3 is a schematic diagram illustrating an exemplary arrangement of a plurality of transmission devices 100.

FIG. 3 is a schematic diagram illustrating an exemplary arrangement of a plurality of transmission devices 100. Herein, suppose that a plurality of transmission devices 100 are arranged in a planar space as illustrated in FIG. 3. By arranging the plurality of transmission devices 100 in a grid, a reception device 150 is able to receive stream data from one of the transmission devices 100, regardless of where the reception device 150 is positioned within a specified area, or even if the reception device 150 moves within the specified area.

Each transmission device 100 in FIG. 3 includes three wireless transmission units 130(1) to 130(3). The PHY rates of the three wireless transmission units 130(1) to 130(3) differ from each other. If the relationships in Formula 1 and Formula 2 discussed earlier are satisfied, typically, a wireless transmission unit with a lower PHY rate has a wider transmission range. In FIG. 3, the transmission range of the wireless transmission unit 130(3) is the widest, while the transmission range of the wireless transmission unit 130(1) is the narrowest. Additionally, as illustrated in FIG. 3, the plurality of transmission devices 100 are arranged in a grid so that the transmission range of the wireless transmission unit 130(3) of each transmission device 100 partially overlap.

Specifically, by arranging the plurality of transmission devices 100 so that the specified area of a reception device 150 discussed above is included in the transmission range of the wireless transmission unit 130(3), it becomes possible to receive stream data even if the reception device 150 moves within the specified area.

Note that the radio frequency band used by each of the wireless transmission units 130(1) to 130(3) in FIG. 3 may be different from the radio frequency band used by a wireless transmission unit of another transmission device 100 positioned adjacently, or another wireless transmission unit in the same transmission device 100. For example, in the case of using a wireless LAN device of the IEEE 802.11 standard as the wireless transmission unit, different channels are used.

(1-6. Stream Data Transmission Process)

An exemplary stream data transmission process according to the first embodiment will be described with reference to FIG. 4.

FIG. 4 is a flowchart illustrating an exemplary stream data transmission process. Note that FIG. 4(*a*) is a flowchart illustrating an exemplary process on the transmission device 100 side, while FIG. 4(*b*) is a flowchart illustrating an exemplary process on the reception device 150 side.

(1-6-1. Exemplary Process by Transmission Device 100)

First, the exemplary process on the transmission device 100 side illustrated in FIG. 4(*a*) will be described. The process in FIG. 4(*a*) is realized as a result of a CPU of a control unit of a transmission device 100 executing a program stored in ROM. Note that the executed program may also be stored on a recording medium such as a Compact Disc (CD), Digital Versatile Disc (DVD), or memory card, or downloaded from a server or the like via the Internet.

FIG. 4(*a*) starts when uncompressed data, including information such as uncompressed images and audio data captured by the camera 50 illustrated in FIG. 1, is input into the transmission device 100 via the video signal input IF.

In FIG. 4(*a*), the transmission device 100 first conducts a stream data transmission process (step S102). In other words, the stream generation units 110(1) to 110(3) of the transmission device 100 generate compressed stream data on the basis of the uncompressed data input from the camera 50, and the wireless transmission units 130(1) to 130(3) transmit the stream data generated by the corresponding stream generation units 110(1) to 110(3) to a reception device 150 by multicasting.

Since the processes conducted by the three stream generation units 110(1) to 110(3) and the three wireless transmission units 130(1) to 130(3) are similar, in the following, the processes of the stream generation unit 110(1) and the wireless transmission unit 130(1) will be described specifically.

The codec 112(1) of the stream generation unit 110(1) conducts compression coding at a predetermined rate on the uncompressed data input from the camera 50. In addition, the codec 112(1) conducts an RTP packetization process conforming to IEEE 3550, and generates RTP stream data. Next, the FEC unit 114(1) conducts a forward error correction (FEC) process on the RTP stream data. The FEC unit 114(1) uses Reed-Solomon packet loss correction codes as the forward error correction codes, for example, to conduct redundant coding for recovery of lost packets.

Next, the RTP unit 116(1) conducts an RTP packetization process conforming to IEEE 3550 on data including the redundantly coded data, and generates an RTP stream including the redundantly coded data. Next, the smoothing unit 118(1) performs a transmission rate smoothing process on the RTP stream. Subsequently, the smoothing unit 118(1) outputs the smoothed RTP stream to the wireless transmission unit 130(1).

Next, the wireless transmission device 132(1) of the wireless transmission unit 130(1) transmits the RTP stream data generated by the stream generation unit 110(1) to a reception device 150 via the wireless transmission network 190 by multicast transmission at a transmission rate in the physical layer configured by the PHY rate configuration unit 134(1).

The description will now return to the flowchart in FIG. 4(a) and proceed. The transmission device 100 conducts the transmission process discussed above for data successively input from the camera 50, and when the transmission process is complete for all data (step S104: Yes), the transmission device 100 completes the process.

(1-6-2. Exemplary Process by Reception Device 150)

Next, the exemplary process on the reception device 150 side illustrated in FIG. 4(b) will be described. The process in FIG. 4(b) is realized as a result of a CPU of a control unit of a reception device 150 executing a program stored in ROM.

In FIG. 4(b), the reception device 150 first conducts a connection destination selection process that selects a connection destination from among the wireless transmission units 130(1) to 130(3) of the transmission device 100 (step S152). Herein, for the connection destination selection process, the reception device 150 conducts a connection destination selection process based on received signal strength, or conducts a connection destination selection process based on TFRC.

(Connection Destination Selection Process Based on Received Signal Strength)

At this point, a connection destination selection process based on received signal strength will be described with reference to FIG. 5.

Figure 5:
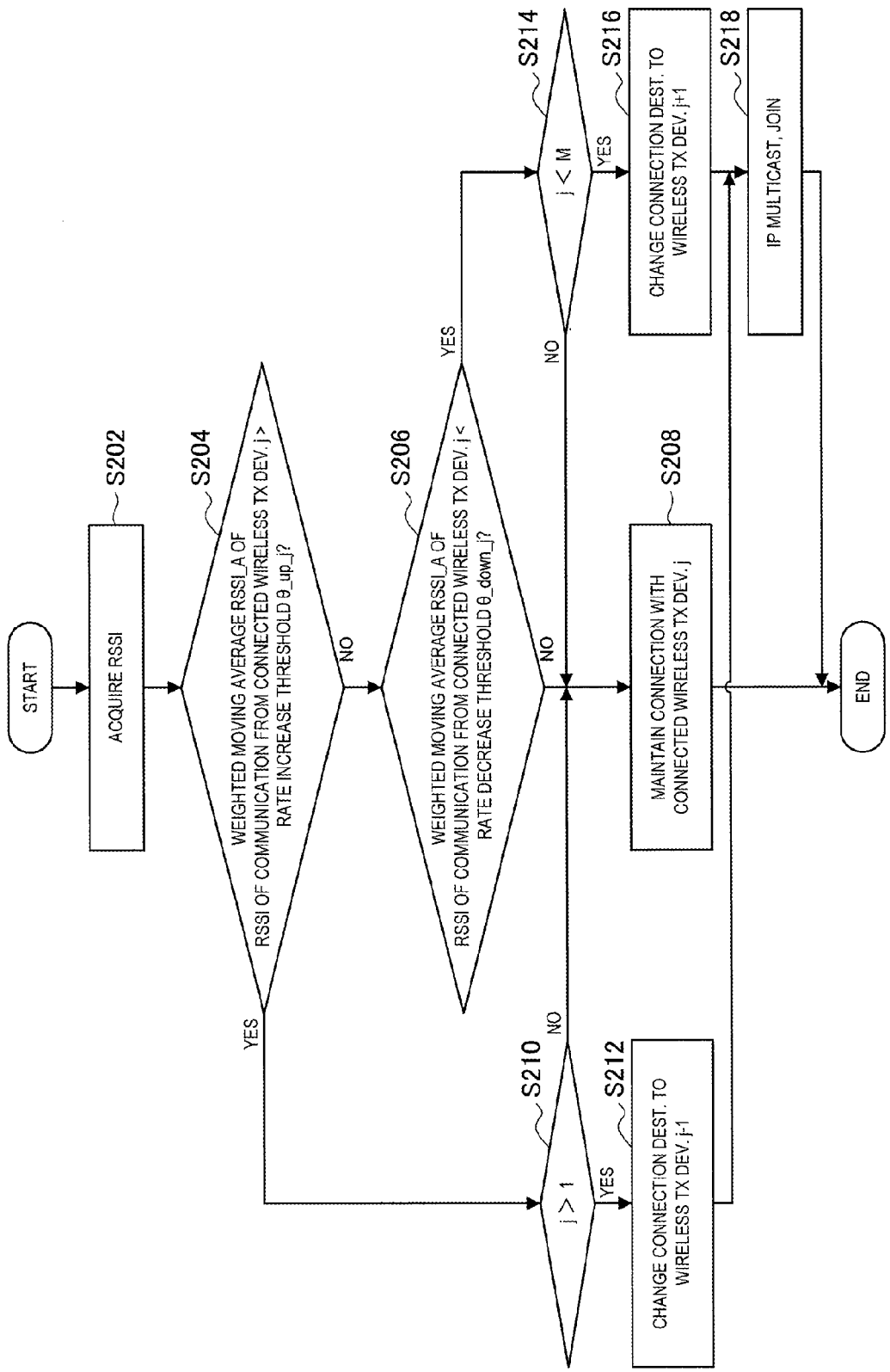
FIG. 5 is a flowchart illustrating a connection destination selection process based on received signal strength.

FIG. 5 is a flowchart illustrating a connection destination selection process based on received signal strength. Herein, the reception device 150(1) will be described as an example. The flowchart in FIG. 5 starts from a state in which the reception device 150(1) is connected to the wireless transmission unit 130(j) of the transmission device 100 ($1 \leq j \leq M$, where j is an integer).

First, the connection destination selection unit 174 of the reception device 150(1) periodically acquires, via the wireless transmission device 162, the received signal strength indicator (RSSI) value of communication with the currently connected wireless transmission unit 130(j) (step S202). In addition, the connection destination selection unit 174 conducts a statistical process such as a moving weighted average process on the acquired received signal strength indicator (RSSI), and acquires an average value RSSI_A.

Next, the connection destination selection unit 174 determines whether or not the average value RSSI_A is greater than a rate increase threshold value $\theta\_up\_j$ (step S204). Subsequently, if the average value RSSI_A is less than the rate increase threshold value $\theta\_up\_j$ in step S204 (No), the connection destination selection unit 174 determines whether or not the average value RSSI_A is less than a rate decrease threshold value $\theta\_down\_j$ (step S206).

Subsequently, if the average value RSSI_A is greater than the rate decrease threshold value $\theta\_down\_j$ in step S206 (No), the connection destination selection unit 174 maintains the connected state with the wireless transmission unit 130(j) (step S208).

If the average value RSSI_A is greater than the rate increase threshold value $\theta\_up\_j$ in step S204 (Yes), the connection destination selection unit 174 determines whether or not j is greater than 1 (step S210). In other words, the connection destination selection unit 174 determines whether or not the currently connected wireless transmission unit 130(j) is the wireless transmission unit 130(1).

Subsequently, if j is greater than 1 in step S210, the connection destination selection unit 174 changes the connection destination to the wireless transmission unit 130(j−1) (step S212). For example, if the current connection destination is the wireless transmission unit 130(2), the connection destination selection unit 174 changes the connection destination to the wireless transmission unit 130(1). In other words, the connection destination selection unit 174 switches the connection destination to the wireless transmission unit (j−1) that transmits stream data of higher content quality than the currently connected wireless transmission unit 130(j).

Subsequently, the reception device 150(1) receives stream data from the changed wireless transmission unit 130(j−1) (step S218).

On the other hand, if j is not greater than 1 in step S210, or in other words if the currently connected wireless transmission unit is the wireless transmission unit 130(1), the connection destination selection unit 174 maintains the connected state with the wireless transmission unit 130(j) (step S208).

Also, if the average value RSSI_A is less than the rate decrease threshold value $\theta\_down\_j$ in step S206 (Yes), the connection destination selection unit 174 determines whether or not j is less than M (step S214). In other words, the connection destination selection unit 174 determines whether or not the currently connected wireless transmission unit 130(j) is the wireless transmission unit 130(3).

Subsequently, if j is less than M in step S214 (Yes), the connection destination selection unit 174 changes the connection destination to the wireless transmission unit 130(j+1) (step S216). For example, if the current connection destination is the wireless transmission unit 130(2), the connection destination selection unit 174 changes the connection destination to the wireless transmission unit 130(3).

In other words, the connection destination selection unit 174 switches the connection destination to the wireless transmission unit (j+1) that transmits stream data of lower content quality than the currently connected wireless transmission unit 130(j). Note that since the quality of the stream data transmitted from the currently connected wireless transmission unit 130(j) is sufficiently high, the quality of the received stream data is still high even after switching to the wireless transmission unit 130(j+1s).

Subsequently, the reception device 150(1) receives stream data from the changed wireless transmission unit 130(j+1) (step S218).

On the other hand, if j is not less than M in step S214 (No), or in other words if the currently connected wireless transmission unit is the wireless transmission unit 130(3), the connection destination selection unit 174 maintains the connected state with the wireless transmission unit 130(j) (step S208). Consequently, the connection destination selection process based on received signal strength ends, and the flow returns to the flowchart in FIG. 4(b).

(Connection Destination Selection Process Based on TFRC)

Next, a connection destination selection process based on TFRC will be described with reference to FIG. 6.

Figure 6:
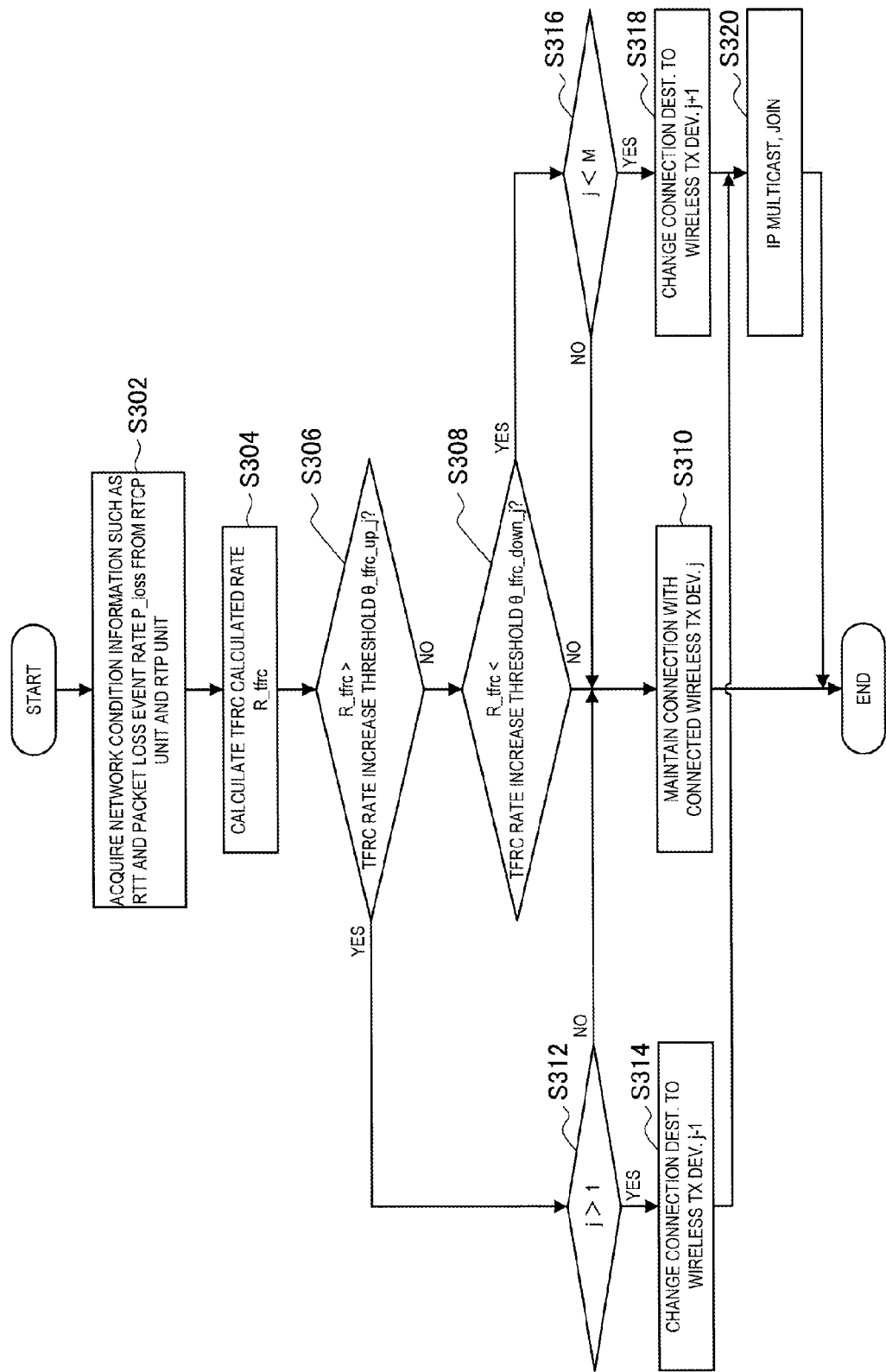
FIG. 6 is a flowchart illustrating a connection destination selection process based on TFRC.

FIG. 6 is a flowchart illustrating a connection destination selection process based on TFRC. Likewise in this case, the reception device 150(1) will be described as an example. The flowchart in FIG. 6 starts from a state in which the reception device 150(1) is connected to the wireless transmission unit 130(j) of the transmission device 100.

First, the connection destination selection unit 174 of the reception device 150(1), following a rate control method such as the TCP Friendly Rate Control (TFRC) described in IETF RFC 3448, acquires the round-trip time (RTT) and the packet loss event rate of the RTP stream with the RTP unit and the RTCP unit (step S302).

Next, the connection destination selection unit 174, on the basis of the values acquired in step S302, calculates the TFRC calculated transmission rate R_tfrc (bps) according to the network conditions (step S304).

Next, the connection destination selection unit 174 determines whether or not the transmission rate R_tfrc calculated in step S304 is greater than a TFRC rate increase threshold value θ_tfrc_up_j (step S306). Note that the TFRC rate increase threshold value θ_tfrc_up_j is defined as follows in Formula 4.

$$\theta\_tfrc\_up\_j = Rd\_(j-1) \quad \text{(Formula 4)}$$

(where j>1)

If the transmission rate R_tfrc is not greater than the TFRC rate increase threshold value θ_tfrc_up_j in step S306 (No), the connection destination selection unit 174 determines whether or not the transmission rate R_tfrc is less than a TFRC rate decrease threshold value θ_tfrc_down_j (step S308). Note that the TFRC rate decrease threshold value θ_tfrc_down_j is defined as follows in Formula 5.

$$\theta\_tfrc\_down\_j = Rd\_(j+1) \quad \text{(Formula 5)}$$

(where j<M)

If the transmission rate R_tfrc is not less than the TFRC rate decrease threshold value θ_tfrc_down_j in step S308 (No), the connection destination selection unit 174 maintains the connected state with the wireless transmission unit 130(j) (step S310).

If the transmission rate R_tfrc is greater than the TFRC rate increase threshold value θ_tfrc_up_j in step S306 (Yes), the connection destination selection unit 174 determines whether or not j is greater than 1 (step S312). In other words, the connection destination selection unit 174 determines whether or not the currently connected wireless transmission unit 130(j) is the wireless transmission unit 130(1).

Subsequently, if j is greater than 1 in step S312, the connection destination selection unit 174 changes the connection destination to the wireless transmission unit 130(j−1) (step S314). For example, if the current connection destination is the wireless transmission unit 130(2), the connection destination selection unit 174 changes the connection destination to the wireless transmission unit 130(1). In other words, the connection destination selection unit 174 switches the connection destination to the wireless transmission unit (j−1) that transmits stream data of higher content quality than the currently connected wireless transmission unit 130(j).

Subsequently, the reception device 150(1) receives stream data from the changed wireless transmission unit 130(j−1) (step S320).

On the other hand, if j is not greater than 1 in step S312, or in other words if the currently connected wireless transmission unit is the wireless transmission unit 130(1), the connection destination selection unit 174 maintains the connected state with the wireless transmission unit 130(j) (step S310).

Also, if the transmission rate R_tfrc is less than the TFRC rate decrease threshold value θ_tfrc_down_j in step S308 (Yes), the connection destination selection unit 174 determines whether or not j is less than M (step S316). In other words, the connection destination selection unit 174 determines whether or not the currently connected wireless transmission unit 130(j) is the wireless transmission unit 130(3).

Subsequently, if j is less than M in step S316 (Yes), the connection destination selection unit 174 changes the connection destination to the wireless transmission unit 130(j+1) (step S318). For example, if the current connection destination is the wireless transmission unit 130(2), the connection destination selection unit 174 changes the connection destination to the wireless transmission unit 130(3). In other words, the connection destination selection unit 174 switches the connection destination to the wireless transmission unit (j+1) that transmits stream data of lower content quality than the currently connected wireless transmission unit 130(j). Note that since the quality of the stream data transmitted from the currently connected wireless transmission unit 130(j) is sufficiently high, the quality of the received stream data is still high even after switching to the wireless transmission unit 130(j+1).

Subsequently, the reception device 150(1) receives stream data from the changed wireless transmission unit 130(j+1) (step S320).

On the other hand, if j is not less than M in step S316 (No), or in other words if the currently connected wireless transmission unit is the wireless transmission unit 130(3), the connection destination selection unit 174 maintains the connected state with the wireless transmission unit 130(j) (step S310). Consequently, the connection destination selection process based on TFRC ends, and the flow returns to the flowchart in FIG. 4(b).

The description will now return to the flowchart in FIG. 4(b) and proceed. After the connection destination selection process, the reception device 150 conducts a process of receiving stream data from the selected wireless transmission unit 130 (step S154).

Specifically, the wireless transmission device 162 of the reception device 150 receives the RTP stream data transmitted from the selected wireless transmission unit 130 via the wireless transmission network 190. Next, the RTP unit 164 analyzes the RTP packets of the RTP stream data. As a result, the RTP unit 164 collects network information about the RTP stream, such as the packet loss rate, network delay, and network jitter information.

Next, the jitter absorption buffer 166 performs a jitter absorption process on the RTP stream data analyzed by the RTP unit 164. Next, if there is packet loss, the FEC unit 168 conducts packet loss recovery if the packet loss is recoverable with the data that was redundantly coded by the transmission device 100. Next, the codec 170 conducts a compression decoding process on the RTP stream data, and outputs to a display device or the like, for example, via the video signal output IF.

The reception device 150 conducts the reception process discussed above for stream data successively transmitted from the transmission device 100, and when the reception process is complete for all data (step S156: Yes), the reception device 150 completes the process.

On the other hand, if there is data transmitted from the transmission device 100 (step S156: No), the reception device 150 repeats the processing of steps S152 and S154. In addition, the processing of steps S152 and S154 is also repeated if the reception device 150 moves and the network environment changes. In other words, if the network environment changes, the reception device 150 switches the wireless transmission unit of the connection destination and continues to receive stream data.

(1-7. Connection Method)

For the connection method between the wireless transmission units 130(1) to 130(M) of the transmission device 100 and the reception device 150, in the following, a connection method in the case of configuring a common ESSID for the wireless transmission units 130(1) to 130(M) and a connection method in the case of configuring different ESSIDs for the wireless transmission units 130(1) to 130(M) will be described.

(Case of Configuring Common ESSID for Wireless Transmission Units)

In this case, suppose that wireless LAN devices described in the IEEE 802.11 standard are used as the wireless transmission devices 132(1) to 132(M) of the wireless transmission units 130(1) to 130(M), and that a common ID is configured as the Extended Service Set Identifier (ESSID) for the wireless transmission devices.

Incidentally, regarding wireless transmission devices configured with a common ESSID, according to the roaming technology stipulated in IEEE 802.11f and IEEE 802.11r, a reception device is able to switch to a transmission device to connect to from among a plurality of transmission devices when triggered by a factor such as (1) a loss of reception of a beacon signal, (2) a drop in the communication rate, or (3) a drop in received signal strength. Ordinarily, when a reception device receives signals while moving among the transmission ranges of a plurality of transmission devices, the roaming technology stipulated in IEEE 802.11f and IEEE 802.11r is used to automatically switch the connection destination to the transmission device disposed in the position with the best communication conditions with respect to the position of the reception device.

In contrast, in the present embodiment, the roaming technology stipulated in IEEE 802.11f and IEEE 802.11r is used to connect to the wireless transmission units 130(1) to 130(M) of the transmission device 100 which have different PHY rates and which transmit streams that compress the same content at different compressed data rates by IP multicasting, while dynamically selecting and changing the connection destination according to the network conditions with the reception device 150. The connection destination selection unit 174 selects one of the wireless transmission devices 132(1) to 132(M) of the selected connection destination from connection destinations configured a common ESSID.

(Case of Configuring Different ESSIDs for Wireless Transmission Units)

In this case, suppose that different ESSIDs are configured for the wireless transmission devices 132(1) to 132(M) of the wireless transmission units 130(1) to 130(M). Under such conditions, when changing the connection destination, the connection destination selection unit 174 connects the connection with the ESSID of the currently selected wireless transmission device, and reconnects to the ESSID of the wireless transmission device of the new connection destination.

<2. Second Embodiment>

An overview of a multicast system 1 according to the second embodiment of the present disclosure will be described with reference to FIG. 7.

Figure 7:
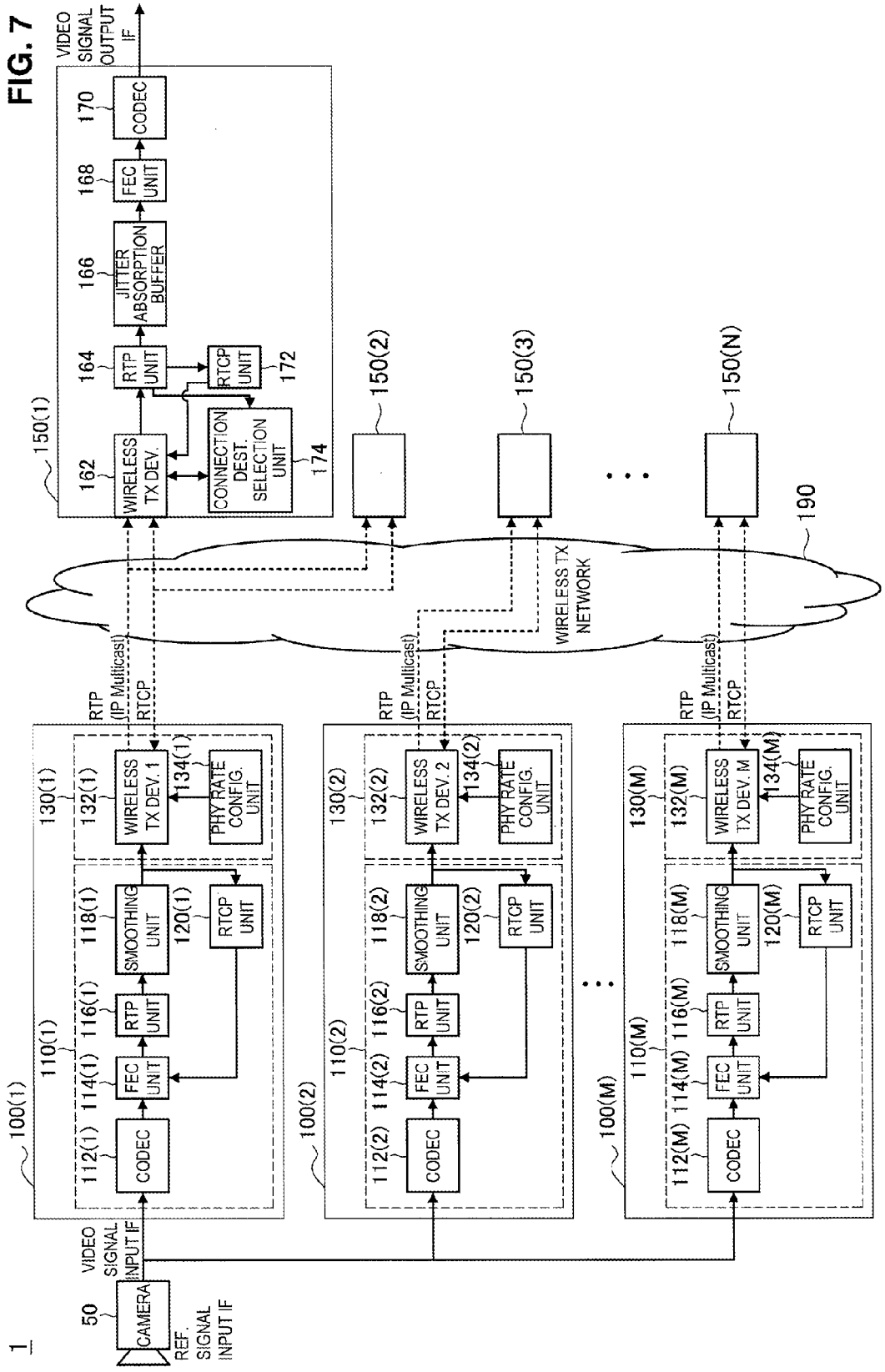
FIG. 7 is a block diagram illustrating an exemplary configuration of a multicast system 1 according to the second embodiment.

FIG. 7 is a block diagram illustrating an exemplary configuration of a multicast system 1 according to the second embodiment. As illustrated in FIG. 7, the multicast system 1 according to the second embodiment likewise includes a plurality of transmission devices 100(1) to 100(M), and a plurality of reception devices 150(1) to 150(N).

In the first embodiment discussed earlier, the plurality of stream generation units 110(1) to 110(M) and the plurality of wireless transmission units 130(1) to 130(M) are provided in a single transmission device 100. In contrast, in the second embodiment, the stream generation units 110(1) to 110(M) and the wireless transmission units 130(1) to 130(M) are provided separately in a plurality of transmission devices 100(1) to 100(M). For example, the stream generation unit 110(1) and the wireless transmission unit 130(1) are provided in the transmission device 100(1), while the stream generation unit 110(2) and the wireless transmission unit 130(2) are provided in the transmission device 100(2).

According to the above configuration, it is possible to independently dispose transmission devices for every data rate of compressed data and every PHY rate of the wireless transmission device.

The stream data generated by the stream generation units 110(1) to 110(M) may also be transmitted to a plurality of reception devices 150. For example, in FIG. 7, the stream data generated by the stream generation unit 110(1) of the transmission device 1 is transmitted to the reception device 150(1) and the reception device 150(2).

As discussed earlier, in the first embodiment, the transmission device 100 is plurally arranged in a grid (see FIG. 3). Likewise in the second embodiment, the transmission devices 100(1) to 100(M) may also be plurally arranged in a grid. The following supposes that M=2, and describes arrangements of the transmission devices 100(1) and 100(2).

Figure 8:
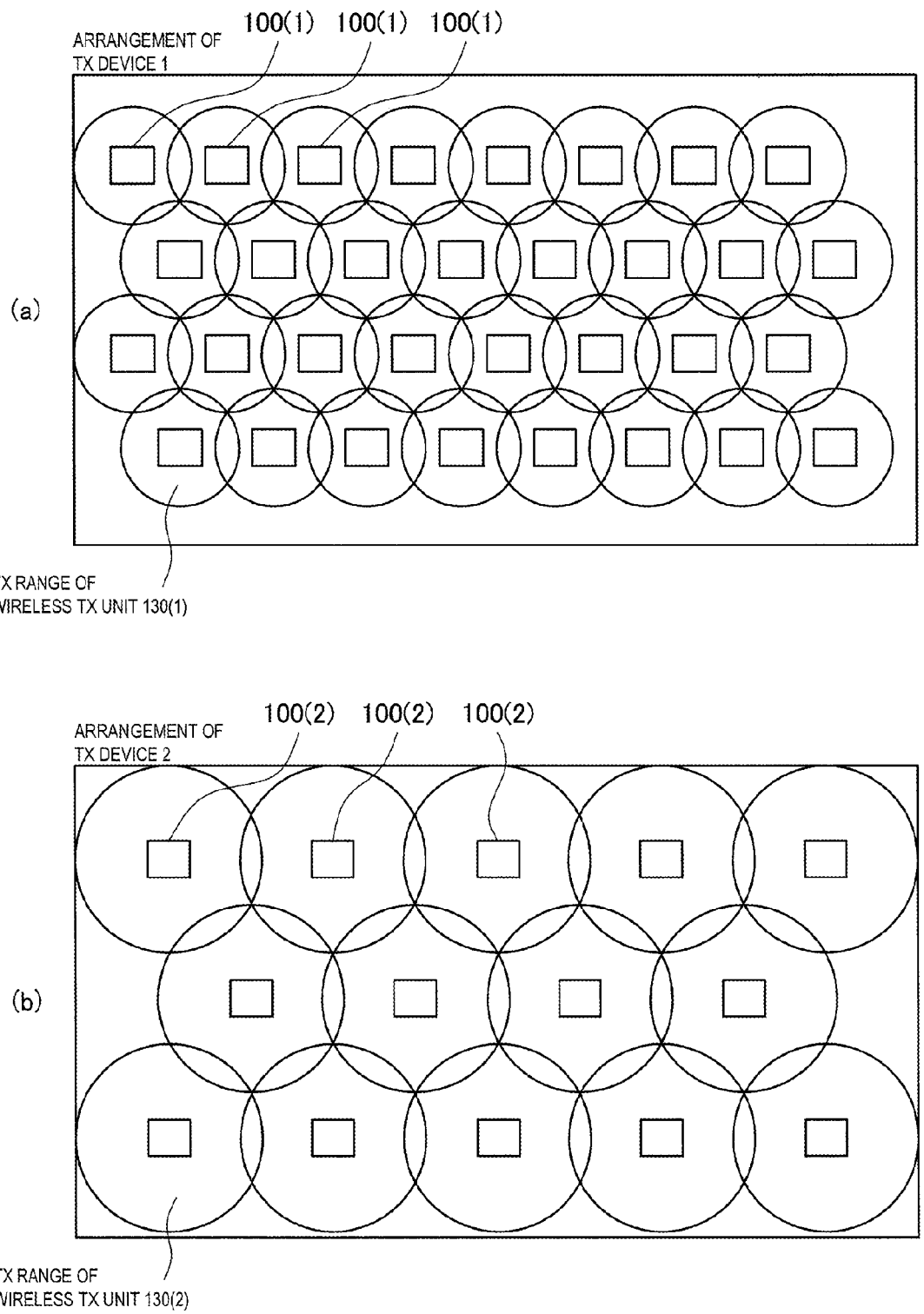
FIG. 8 is a schematic diagram illustrating exemplary arrangements of transmission devices 100(1) and 100(2) according to the second embodiment.

FIG. 8 is a schematic diagram illustrating exemplary arrangements of transmission devices 100(1) and 100(2) according to the second embodiment. In the second embodiment, the transmission device 100(1) is plurally arranged in a grid as illustrated in FIG. 8(a), while the transmission device 100(2) is plurally arranged in a grid as illustrated in FIG. 8(b). In this way, by arranging the transmission devices 100(1) and 100(2) in grids, a reception device 150 is able to receive stream data from one of the transmission devices 100, regardless of where the reception device 150 is positioned within a specified area, or even if the reception device 150 moves within the specified area.

Particularly, in the case of the second embodiment, by making the specified area of the reception device 150 be included in the transmission range of the wireless transmission units 130(1) of the transmission devices 100(1), while also being included in the transmission ranges of the wireless transmission units 130(2) of the transmission devices 100(2), the reception device 150 becomes able to receive high-quality stream data at nearly every location in the specified area.

Note that the radio frequency band used by the wireless transmission units 130(1) to 130(M) may be different from the radio frequency band used by a wireless transmission unit of another transmission device 100 with an overlapping transmission range. For example, in the case of using a wireless LAN device of the IEEE 802.11 standard as the wireless transmission unit, different channels are used.

<3. Third Embodiment>

An overview of a multicast system 1 according to the third embodiment of the present disclosure will be described with reference to FIG. 9.

Figure 9:
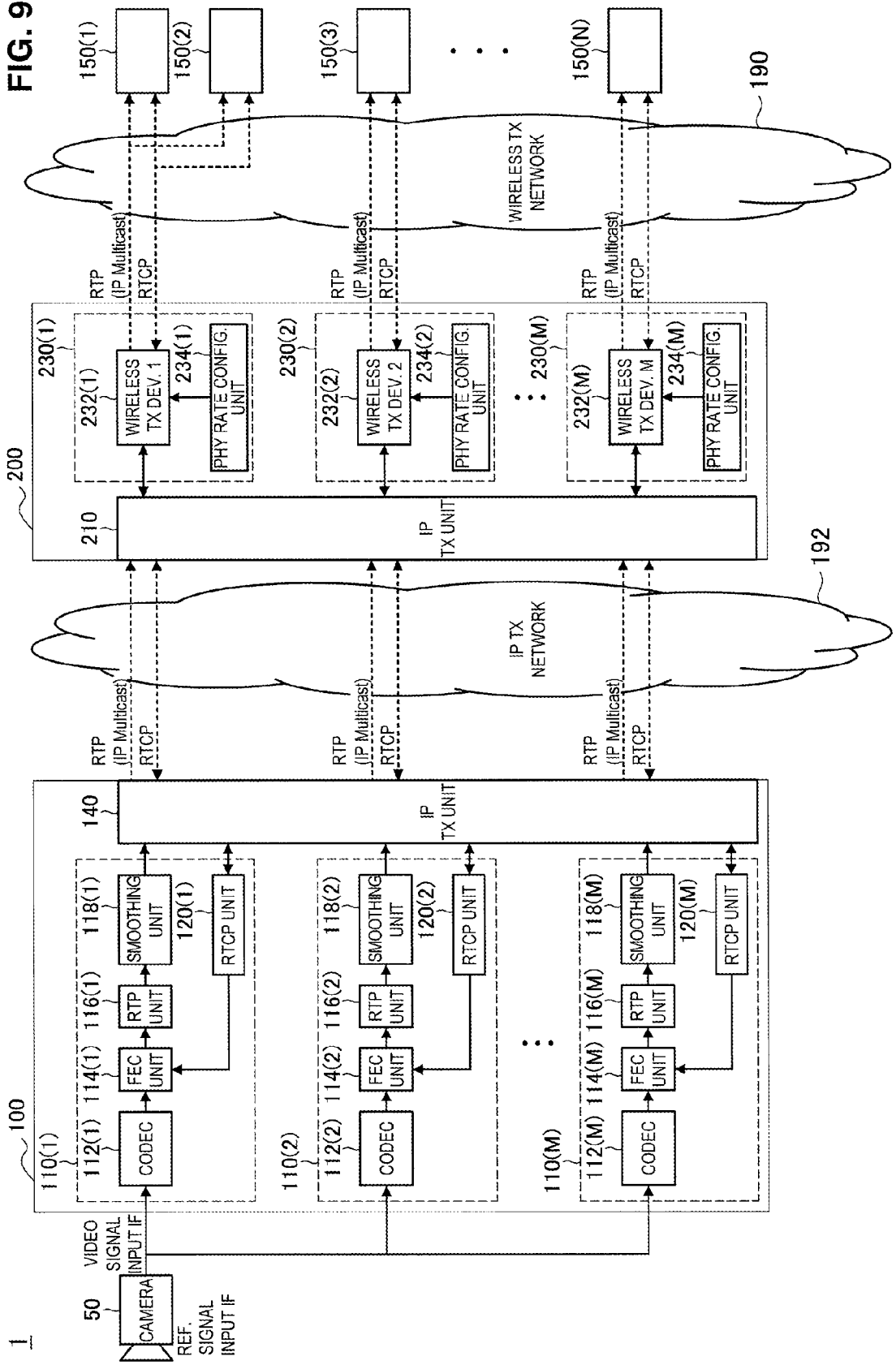
FIG. 9 is a block diagram illustrating an exemplary configuration of a multicast system 1 according to the third embodiment.

FIG. 9 is a block diagram illustrating an exemplary configuration of a multicast system 1 according to the third embodiment. As illustrated in FIG. 9, the multicast system 1 according to the third embodiment includes a transmission device 100, a plurality of reception devices 150(1) to 150(N), and a radio relay device 200.

The radio relay device 200 has the function of a relay device that transmits stream data from the transmission device 100 to the reception devices 150(1) to 150(N). For the radio relay device 200, what is called an Access Point (AP) for wireless LAN connection conforming to the IEEE 802.11 standard may be used, for example.

In the first embodiment, the plurality of stream generation units 110(1) to 110(M) and the plurality of wireless transmission units 130(1) to 130(M) are provided in a single transmission device 100. In contrast, in the third embodiment, as illustrated in FIG. 9, the plurality of stream generation units 110(1) to 110(M) are provided in the transmission device 100, while a plurality of wireless transmission units 230(1) to 230(M) are separately provided in the radio relay device 200.

Additionally, in the third embodiment, the transmission device 100 includes an IP transmission unit 140, the radio relay device 200 includes an IP transmission unit 210, and the transmission device 100 and the radio relay device 200 are connected by an IP transmission network 192. Note that although FIG. 9 illustrates the case of a wireless connection method on the IP transmission network, the connection method is not limited thereto, and may also be wired.

In the third embodiment, the stream generation units 110(1) to 110(M) of the transmission device 100 output generated streams to the IP transmission unit 140. Subsequently, the IP transmission unit 140 transmits the streams to the IP transmission unit 210 of the radio relay device 200 via the IP transmission network 192. The IP transmission unit 210 of the radio relay device 200 outputs the received streams to the wireless transmission units 230(1) to 230(M) corresponding to each of the stream generation units 110(1) to 110(M). For example, the IP transmission unit 210 outputs the stream data generated by the stream generation unit 110(1) to the wireless transmission unit 230(1), and outputs the stream data generated by the stream generation unit 110(2) to the wireless transmission unit 230(2).

The configuration of the wireless transmission units 230(1) to 230(M) is similar to the wireless transmission units 130(1) to 130(M) of the first embodiment. The wireless transmission devices 232(1) to 232(M) of the wireless transmission units 230(1) to 230(M) transmit RTP stream data to reception devices 150 via the wireless transmission network 190, at a transmission rate configured by the PHY rate configuration units 234(1) to 234(M).

As discussed earlier, in the first embodiment, the transmission device 100 is plurally arranged in a grid (see FIG. 3). In the third embodiment, the radio relay device 200 may be plurally arranged in a grid instead of the transmission device 100. Consequently, even if there is a small number of transmission devices 100 (for example, a single device as illustrated in FIG. 9), a reception device 150 is still able to receive stream data over a wide range via a plurality of radio relay devices 200. Additionally, a reception device 150 is able to receive stream data while moving.

<4. Fourth Embodiment>

An overview of a multicast system 1 according to the fourth embodiment of the present disclosure will be described with reference to FIG. 10.

Figure 10:
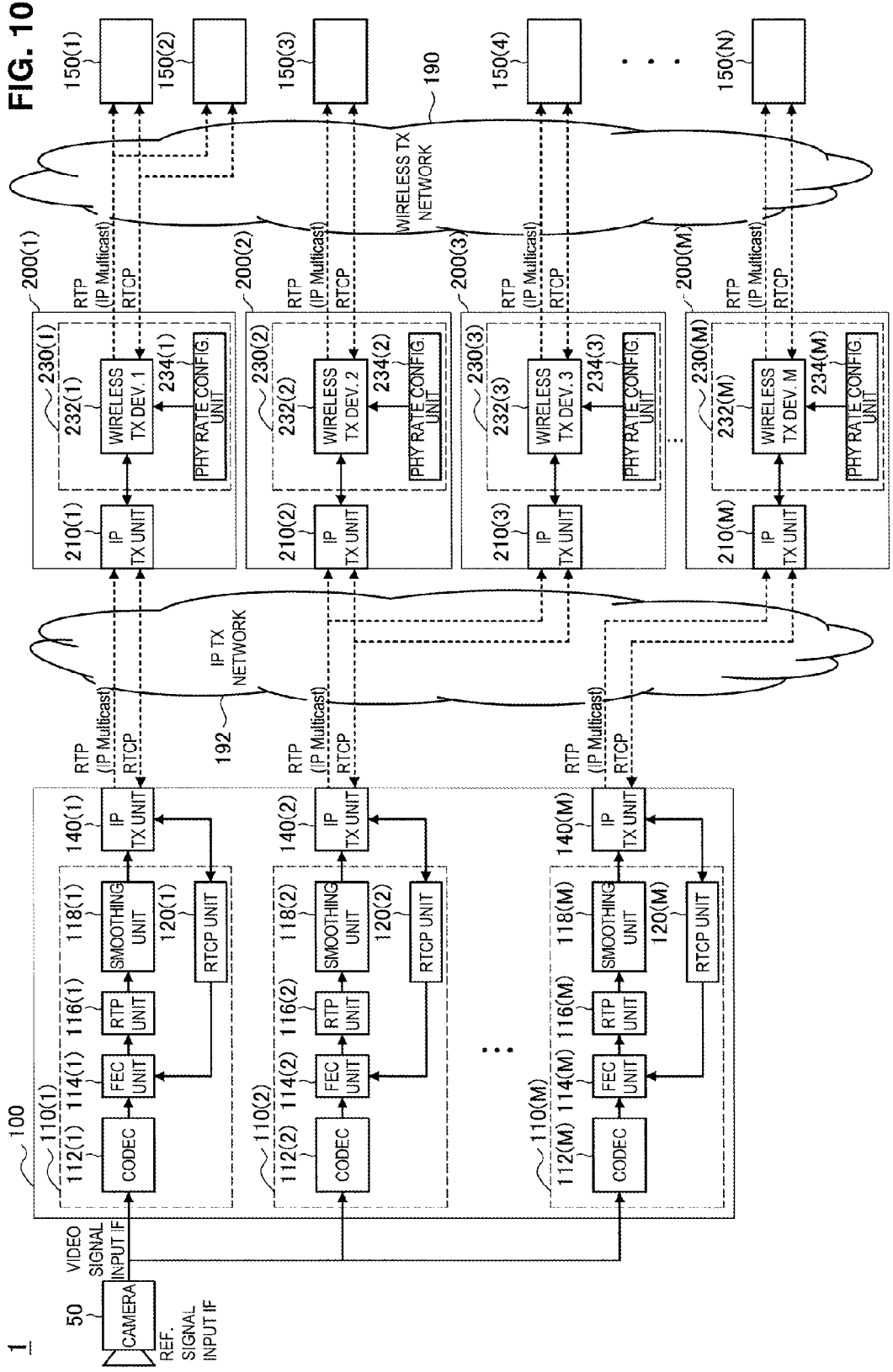
FIG. 10 is a block diagram illustrating an exemplary configuration of a multicast system 1 according to the fourth embodiment.

FIG. 10 is a block diagram illustrating an exemplary configuration of a multicast system 1 according to the fourth embodiment. As illustrated in FIG. 10, the multicast system 1 according to the fourth embodiment includes a transmission device 100, a plurality of reception devices 150(1) to 150(N), and a plurality of radio relay devices 200(1) to 200(M).

The fourth embodiment differs from the third embodiment illustrated in FIG. 9 in that the plurality of wireless transmission units 230(1) to 230(M) are separated into a plurality of radio relay devices 200(1) to 200(M). For example, the wireless transmission unit 230(1) is provided in the radio relay device 200(1), while the wireless transmission unit 230(2) is provided in the radio relay device 200(2). Note that although FIG. 10 illustrates providing one wireless transmission unit each in the plurality of radio relay devices 200(1) to 200(M), the configuration is not limited thereto, and the number of wireless transmission units provided in each of the radio relay devices 200(1) to 200(M) may also differ.

The generated stream data from a stream generation unit of the transmission device 100 may also be transmitted to a plurality of radio relay devices 200. For example, in FIG. 10, the generated stream data from the stream generation unit 110(2) is transmitted to the radio relay device 200(2) and the radio relay device 200(3).

Likewise in the fourth embodiment, the plurality of radio relay devices 200(1) to 200(M) may be arranged in a grid, similarly to the third embodiment. Consequently, even if there is a small number of transmission devices 100 (for example, a single device as illustrated in FIG. 10), a reception device 150 is still able to receive stream data over a wide range via the plurality of radio relay devices 200(1) to 200(M). Additionally, a reception device 150 is able to receive stream data while moving.

<5. Fifth Embodiment>

An overview of a multicast system 1 according to the fifth embodiment of the present disclosure will be described with reference to FIG. 11.

FIG. 11 is a block diagram illustrating an exemplary configuration of a multicast system 1 according to the fifth embodiment. As illustrated in FIG. 11, the multicast system 1 according to the fifth embodiment includes a plurality of transmission devices 100(1) to 100(M), a plurality of reception devices 150(1) to 150(N), and a plurality of radio relay devices 200(1) to 200(M).

The fifth embodiment differs from the fourth embodiment illustrated in FIG. 10 in that the plurality of stream generation units 110(1) to 110(M) are separated into a plurality of transmission devices 100(1) to 100(M). For example, the stream generation unit 110(1) is provided in the transmission device 100(1), while the stream generation unit 110(2) is provided in the transmission device 100(2). Note that although FIG. 11 illustrates providing one stream generation unit each in the plurality of transmission devices 100(1) to 100(M), the configuration is not limited thereto, and the number of stream generation units provided in each of the transmission devices 100(1) to 100(M) may also differ.

<6. Conclusion>

As discussed above, a reception device 150 of the multicast system 1 of the present disclosure acquires environment change information related to a change in the network environment with the transmission device 100, and on the basis of the acquired environment change information, selects one wireless transmission unit from among the plurality of wireless transmission units 130(1) to 130(M) as the connection destination.

In other words, by receiving a signal while dynamically switching the wireless transmission unit to receive from, even in wireless multicast transmission and similarly to unicast transmission, there are obtained advantageous effects similar to receiving a signal while conducting pseudo-rate control between the transmission device 100 and the reception device 150.

Consequently, it is possible to always receive content transmission of the highest quality in a network environment, while also accommodating dynamic changes in the environment over time. Also, even if the reception device moves, it is possible to receive from a wireless transmission unit 130 the highest-quality content in the network environment according to position.

In addition, according to the multicast system 1 described above, in wireless multicast transmission from the transmission device 100, when transmitting content to a plurality of reception devices 150, transmission at a transmission rate and a content quality according to the network environment for every reception device 150 becomes possible.

In addition, in ordinary wireless multicast transmission, transmitting content to a plurality of reception devices is only possible by adapting to the network environment of the reception device with the worst network environment, and transmitting content of low quality. However, according to the embodiments herein, transmission at a content quality according to the network environment of each reception device becomes possible.

Also, in ordinary wireless multicast transmission, transmitting while prioritizing content quality requires the configuration of a high transmission rate in the physical layer in the wireless transmission unit, which cannot be received by a reception device in a degraded network environment. However, according to the embodiments herein, transmission at a content quality according to the network environment of each reception device becomes possible.

It should be understood by those skilled in the art that various modifications, combinations, sub-combinations and alterations may occur depending on design requirements and other factors insofar as they are within the scope of the appended claims or the equivalents thereof.

Although the foregoing embodiments describe an example of treating uncompressed data input by a camera as the content, if the content is already saved in the transmission device as a file, the content file may also be compressed data.

The foregoing embodiments describe the case of using a wireless LAN device as the wireless transmission device, but are not limited thereto. For example, a device conforming to the third generation of mobile telecommunications technology (3G), the fourth generation of mobile telecommunications technology (such as 4G: LTE-Advanced), IEEE 802.16e (WiMAX), or Long Term Evolution (LTE) may also be used as the wireless transmission device. In such cases, multicast transmission may be conducted using the Multimedia Broadcast Multicast Service (MBMS), for example.

The steps illustrated in the flowcharts in the embodiments naturally include processes performed in the described and chronological order, and further include processes that are not necessarily performed in chronological order, but are also performed in parallel or are individually performed. Needless to say, it is also possible to change the order as necessary even in the steps for chronologically performing the processes.

The processing by the information processing apparatus described herein may be realized by any one of software, hardware, and a combination of software and hardware. Programs included in the software are stored in advance, for example, in recording media provided inside or outside of the respective apparatuses. Each program is read out, for example, by random access memory (RAM) when each program is executed, and executed by a processor such as a CPU.

Additionally, the present technology may also be configured as below.

(1)

A reception device including:

a reception unit that receives stream data transmitted by multicast transmission from a plurality of transmitters at respective different transmission rates in a physical layer;

an acquisition unit that acquires environment change information related to a change in a network environment with the transmitters; and a connection destination selection unit that selects, on the basis of the acquired environment change information, one transmitter from among the plurality of transmitters as a connection destination of the reception unit.

(2)

The reception device according to (1), wherein the acquisition unit acquires a received signal strength indicator from the transmitters, and the connection destination selection unit selects, on the basis of the acquired received signal strength indicator, one transmitter from among the plurality of transmitters as a connection destination of the reception unit.

(3)

The reception device according to (1), wherein the acquisition unit acquires a TCP Friendly Rate Control (TFRC) transmission rate according to a TFRC rate control scheme, and the connection destination selection unit selects, on the basis of the acquired TFRC transmission rate, one transmitter from among the plurality of transmitters as a connection destination of the reception unit.

(4)

The reception device according to any one of (1) to (3), wherein the connection destination selection unit switches a connection destination to a transmitter corresponding to a next largest transmission rate following a transmission rate of a currently connected transmitter, or to a transmitter corresponding to a next smallest transmission rate following a transmission rate of a currently connected transmitter, as the one transmitter.

(5)

The receiving device according to any one of (1) to (4), wherein the plurality of transmitters are provided in a relay device that connects a transmission device, which generates and transmits the stream data of different transmission rates, and the reception device.

(6)

The reception device according to any one of (1) to (4), wherein the plurality of transmitters are provided in a transmission device that generates and transmits the stream data of different transmission rates.

(7)

The reception device according to any one of (1) to (6), wherein the plurality of transmitters have respective different transmission ranges.

(8)

A transmission/reception system including:

a plurality of transmitters that transmit stream data by multicast transmission at respective different transmission rates in a physical layer; and one or a plurality of reception devices that receive the stream data transmitted by multicast transmission from the transmitters, wherein the reception device includes a reception unit that receives stream data transmitted by multicast transmission from the plurality of transmission units at respective different transmission rates in a physical layer, an acquisition unit that acquires environment change information related to a change in a network environment with the transmitters, and a connection destination selection unit that selects, on the basis of the acquired environment change information, one transmitter from among the plurality of transmitters as a connection destination of the reception unit.

(9)

A reception method including:

receiving stream data transmitted by multicast transmission from a plurality of transmitters at respective different transmission rates in a physical layer;

acquiring environment change information related to a change in a network environment with the transmitters; and selecting, on the basis of the acquired environment change information, one transmitter from among the plurality of transmitters as a connection destination of a reception unit.

(10)

A program causing a computer to execute:

receiving stream data transmitted by multicast transmission from a plurality of transmitters at respective different transmission rates in a physical layer;

acquiring environment change information related to a change in a network environment with the transmitters; and selecting, on the basis of the acquired environment change information, one transmitter from among the plurality of transmitters as a connection destination of a reception unit.

REFERENCE SIGNS LIST 1 multicast system
50 camera
100 transmission device
110 stream generation unit
130 wireless transmission unit
132 wireless transmission device
134 PHY rate configuration unit
150 reception device
162 wireless transmission device
174 connection destination selection unit
190 wireless transmission network
192 IP transmission network
200 radio relay device

The invention claimed is:

1. A reception device comprising circuitry configured to operate as:
   a reception unit that receives stream data transmitted by multicast transmission from a plurality of transmitters at respective different transmission rates;
   an acquisition unit that acquires environment change information related to a change in a network environment with the transmitters; and
   a connection destination selection unit that selects, on the basis of the acquired environment change information, one transmitter from the plurality of transmitters as a connection destination of the reception unit, wherein:
   a first transmitter of the plurality of transmitters transmits a same content in multicast transmission as a content transmitted by a second transmitter of the plurality of transmitters,
   a data rate of an encoded content transmitted by the first transmitter is different from a data rate of an encoded content transmitted by the second transmitter,
   a transmission rate of the first transmitter is set based on the data rate of the encoded content transmitted by the first transmitter, and
   a transmission rate of the second transmitter is set based on the data rate of the encoded content transmitted by the second transmitter.

2. The reception device according to claim 1, wherein
   the acquisition unit acquires a received signal strength indicator from the transmitters, and
   the connection destination selection unit selects, on the basis of the acquired received signal strength indicator, one transmitter from among the plurality of transmitters as a connection destination of the reception unit.

3. The reception device according to claim 1, wherein
   the acquisition unit acquires a TCP Friendly Rate Control (TFRC) transmission rate according to a TFRC rate control scheme, and
   the connection destination selection unit selects, on the basis of the acquired TFRC transmission rate, one transmitter from among the plurality of transmitters as a connection destination of the reception unit.

4. The reception device according to claim 1, wherein
   the connection destination selection unit switches a connection destination to a transmitter corresponding to a next largest transmission rate following a transmission rate of a currently connected transmitter, or to a transmitter corresponding to a next smallest transmission rate following a transmission rate of a currently connected transmitter, as the one transmitter.

5. The receiving device according to claim 1, wherein
   the plurality of transmitters are provided in a relay device that connects a transmission device, which generates and transmits the stream data of different transmission rates, and the reception device.

6. The reception device according to claim 1, wherein the plurality of transmitters are provided in a transmission device that generates and transmits the stream data of different transmission rates.

7. The reception device according to claim 1, wherein the plurality of transmitters have respective different transmission ranges.

8. A transmission/reception system comprising:
a plurality of transmitters that transmit stream data by multicast transmission at respective different transmission rates; and
one or a plurality of reception devices that receive the stream data transmitted by multicast transmission from the transmitters,
wherein the reception device includes circuitry configured to operate as
a reception unit that receives stream data transmitted by multicast transmission from the plurality of transmission units at respective different transmission rates,
an acquisition unit that acquires environment change information related to a change in a network environment with the transmitters, and
a connection destination selection unit that selects, on the basis of the acquired environment change information, one transmitter from the plurality of transmitters as a connection destination of the reception unit, wherein:
a first transmitter of the plurality of transmitters transmits a same content in multicast transmission as a content transmitted by a second transmitter of the plurality of transmitters,
a data rate of an encoded content transmitted by the first transmitter is different from a data rate of an encoded content transmitted by the second transmitter,
a transmission rate of the first transmitter is set based on the data rate of the encoded content transmitted by the first transmitter, and
a transmission rate of the second transmitter is set based on the data rate of the encoded content transmitted by the second transmitter.

9. A reception method comprising:
receiving stream data transmitted by multicast transmission from a plurality of transmitters at respective different transmission rates;
acquiring environment change information related to a change in a network environment with the transmitters; and
selecting, on the basis of the acquired environment change information, one transmitter from the plurality of transmitters as a connection destination of a reception unit, wherein:
a first transmitter of the plurality of transmitters transmits a same content in multicast transmission as a content transmitted by a second transmitter of the plurality of transmitters,
a data rate of an encoded content transmitted by the first transmitter is different from a data rate of an encoded content transmitted by the second transmitter,
a transmission rate of the first transmitter is set based on the data rate of the encoded content transmitted by the first transmitter, and
a transmission rate of the second transmitter is set based on the data rate of the encoded content transmitted by the second transmitter.

10. A non-transitory, computer-readable medium encoded with instructions which, when executed by a computer, cause the computer to perform a method comprising:
receiving stream data transmitted by multicast transmission from a plurality of transmitters at respective different transmission rates;
acquiring environment change information related to a change in a network environment with the transmitters; and
selecting, on the basis of the acquired environment change information, one transmitter from the plurality of transmitters as a connection destination of a reception unit, wherein:
a first transmitter of the plurality of transmitters transmits a same content in multicast transmission as a content transmitted by a second transmitter of the plurality of transmitters,
a data rate of an encoded content transmitted by the first transmitter is different from a data rate of an encoded content transmitted by the second transmitter,
a transmission rate of the first transmitter is set based on the data rate of the encoded content transmitted by the first transmitter, and
a transmission rate of the second transmitter is set based on the data rate of the encoded content transmitted by the second transmitter.

* * * * *